United States Patent
Saito (10) Patent No.: US 8,491,206 B2
(45) Date of Patent: Jul. 23, 2013

(54) LIGHT AMOUNT ADJUSTMENT DEVICE CAPABLE OF ADJUSTING AMOUNT OF LIGHT AT HIGH SPEED AND WITH ACCURACY

(75) Inventor: Junichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/438,420

(22) Filed: Apr. 3, 2012

(65) Prior Publication Data

US 2012/0301133 A1 Nov. 29, 2012

(30) Foreign Application Priority Data

May 27, 2011 (JP) .................................. 2011-119161

(51) Int. Cl.
*G03B 9/02* (2006.01)
(52) U.S. Cl.
USPC .......................................................... 396/508
(58) Field of Classification Search
USPC .......................................................... 396/508
See application file for complete search history.

(56) References Cited

U.S. PATENT DOCUMENTS

| 7,242,123 B2* | 7/2007 | Miyawaki | 310/156.32 |
| 7,513,701 B2* | 4/2009 | Naganuma | 396/454 |
| 7,679,231 B2* | 3/2010 | Yasuda | 396/463 |
| 2006/0008270 A1* | 1/2006 | Naganuma | 396/469 |

FOREIGN PATENT DOCUMENTS

JP 4247024 4/2009

* cited by examiner

*Primary Examiner* — Rodney Fuller
(74) *Attorney, Agent, or Firm* — Cowan, Liebowitz & Latman, P.C.

(57) ABSTRACT

A light amount adjustment device capable of adjusting the amount of light at high speed and with accuracy. When a rotary plate is rotatively driven by a motor, diaphragm blades disposed between the rotary plate and a cam plate are rotatively driven by the rotary plate in a plane perpendicular to an optical axis. When a coil disposed on the cam plate through a back yoke is energized and a magnetic field is generated around the coil, a magnetic attracting force is applied to the rotary plate rotating under the magnetic field, whereby the rotary plate is displaced toward the back yoke and frictions between the diaphragm blades and the rotary plate, etc. increase, so that rotations of the diaphragm blades are decelerated.

10 Claims, 9 Drawing Sheets

LIGHT AMOUNT ADJUSTMENT DEVICE CAPABLE OF ADJUSTING AMOUNT OF LIGHT AT HIGH SPEED AND WITH ACCURACY

BACKGROUND OF THE INVENTION

1. Field of the Invention

The present invention relates to a light amount adjustment device mounted to an image pickup apparatus or the like.

2. Description of the Related Art

Conventionally, some image pickup apparatus such as a digital camera or a digital single-lens reflex camera is mounted with a mechanical light amount adjustment device such as a shutter device for exposure operation or a diaphragm device for diaphragm operation.

Since recent image pickup devices have high sensitivity, the shutter device is required to operate at high speed to prevent over-exposure at the time of high sensitivity photographing under bright condition. The diaphragm device is required to be driven at high speed and with accuracy in order to shorten a release time lag from when a release button is pressed by a photographer to when an image is actually picked up.

An image pickup apparatus using a galvanic diaphragm device having a diaphragm member of float structure is disclosed in Japanese Patent Publication No. 4247024. Depending on the diaphragm aperture change speed, the diaphragm member of float structure sometimes overshoots a target aperture value. In that case, the time required for photographing becomes long. Thus, the diaphragm device disclosed in Japanese Patent Publication No. 4247024 has a plunger that presses the diaphragm member to stop the diaphragm member.

However, a scratch or dent is sometimes produced at that part of the diaphragm member which is pressed by the plunger. In the case of the diaphragm member which is thin in thickness such as a light-shield member, there is a fear that the diaphragm member does not operate smoothly, so that a light amount adjustment cannot be carried out with accuracy. In addition, a space is required for installation of the plunger.

SUMMARY OF THE INVENTION

The present invention provides a light amount adjustment device capable of adjusting the amount of light at high speed and with accuracy.

According to one aspect of this invention, there is provided a light amount adjustment device comprising a drive source, a base member formed with an aperture opening through which photographing light passes, a driven member configured to be driven by the drive source, at least part of the driven member being a soft magnetic portion, a light-shield member disposed between the base member and the driven member and configured to be driven by the driven member, and a coil disposed on the base member and configured to generate a magnetic field when the coil is electrically energized, wherein a magnetic attracting force is applied to the soft magnetic portion of the driven member that is driven by the drive source under the magnetic field, whereby the soft magnetic portion is displaced toward the base member.

With this invention, the amount of light can be adjusted at high speed and with accuracy.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
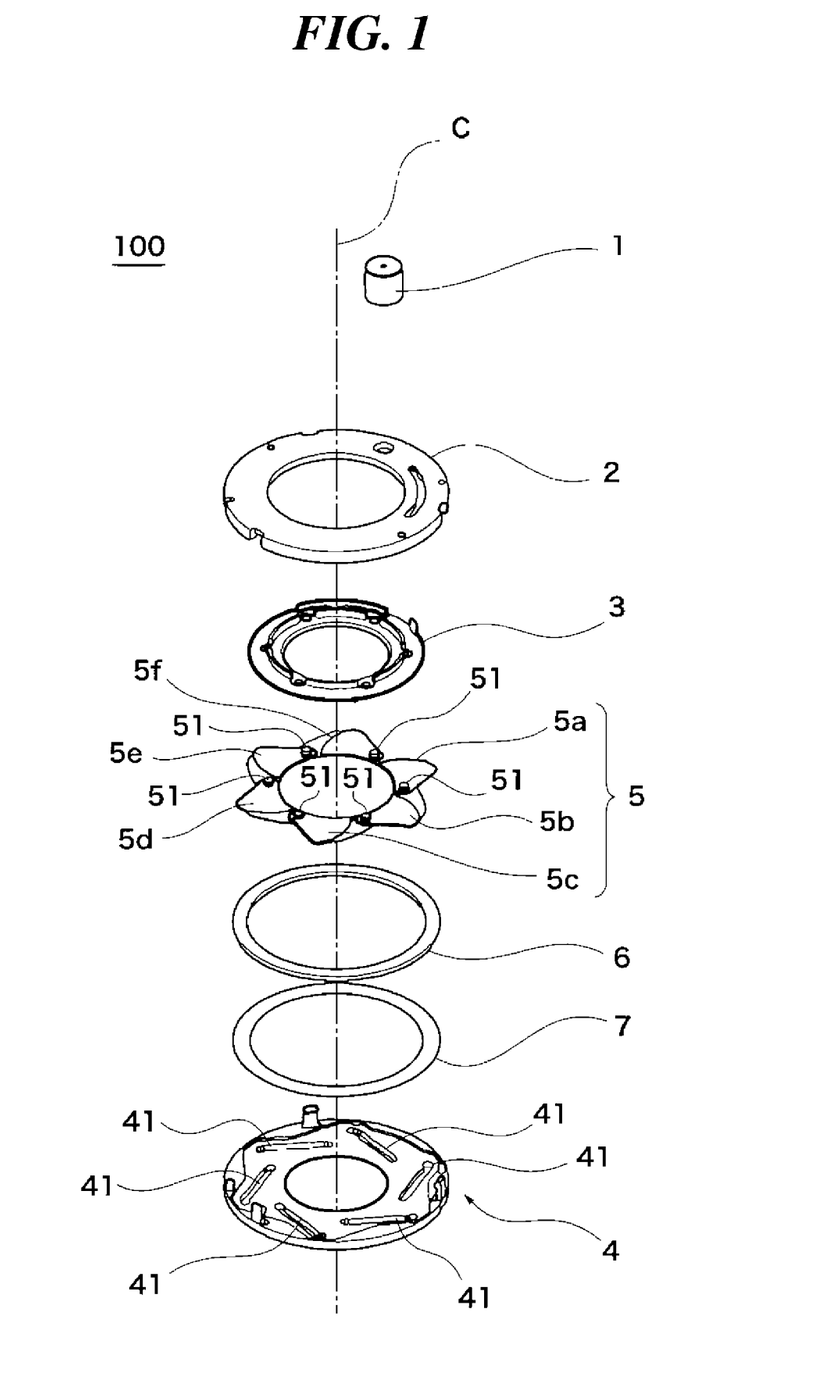
FIG. 1 is an exploded perspective view showing the construction of a light amount adjustment device according to a first embodiment of this invention.
Figure 2:
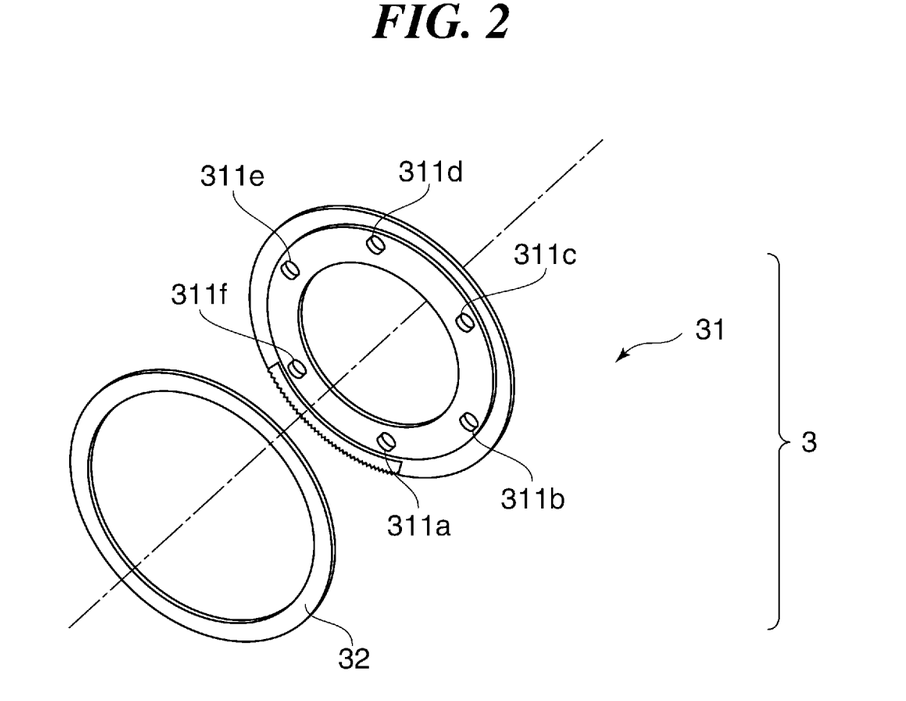
FIG. 2 is an exploded perspective view showing the construction of a rotary plate of the light amount adjustment device.

FIG. 1 shows in exploded perspective view the construction of a light amount adjustment device according to a first embodiment of this invention, and FIG. 2 shows in exploded perspective view the construction of a rotary plate of the light amount adjustment device.

The light amount adjustment device of this embodiment, which is denoted by reference numeral 100, is a diaphragm device. The diaphragm device 100 is mounted to an interchangeable lens attached to a digital single-lens reflex camera or the like, and used for exposure adjustment at the time of image pickup.

The light amount adjustment device 100 includes a motor 1 (drive source) which is, e.g., a stepping motor, a cover plate 2 to which the motor 1 is fixed, a rotary plate 3 (driven member) fitted into a central hole formed in the cover plate 2, and a cam plate 4 (base member) formed with a central aperture opening through which photographing light passes.

Between the cover plate 2 and the cam plate 4, there are disposed the rotary plate 3, a plurality of (e.g., six) diaphragm blades 5a to 5f (hereinafter, these blades are sometimes denoted by reference numeral 5 collectively or without distinction therebetween) serving as light-shield members, a coil 6, and a back yoke 7. The cam plate 4 is formed with cam grooves 41. Dowels 51 are formed on respective ones of the diaphragm blades 5 on the side close to the rotary plate 3.

As shown in FIG. 2, the rotary plate 3 is comprised of an annular plate portion 31 and an annular soft magnetic portion 32. The plate portion 31 is formed with fitting holes 311a to 311f (hereinafter sometimes denoted by reference numeral 311 collectively or without distinction therebetween) so as to correspond to respective ones of the dowels 51 of the diaphragm blades 5 (FIG. 1). An arcuate gear portion is formed at an outer peripheral edge of the plate portion 31.

Figure 3A:
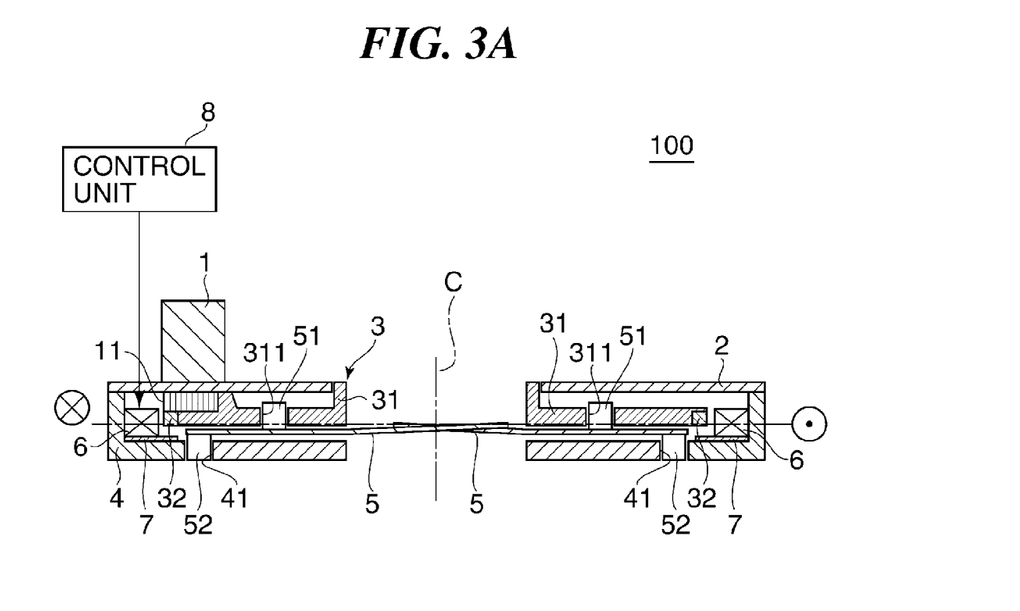
FIG. 3A is a vertical section view schematically showing the light amount adjustment device after assembly.
Figure 3B:
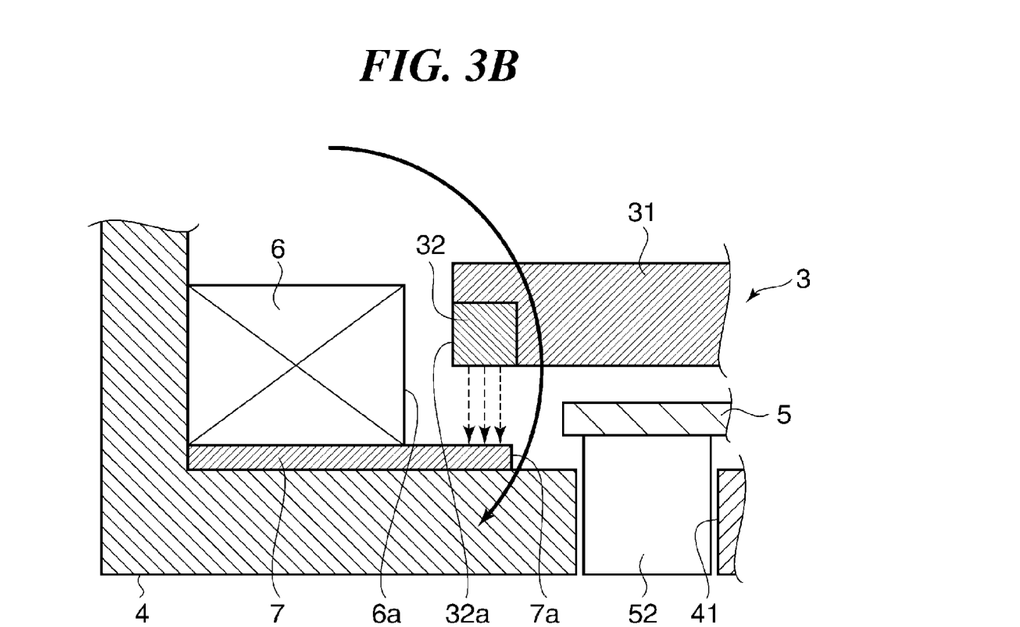
FIG. 3B is a fragmentary enlarged section view showing a coil and a back yoke of the light amount adjustment device, together with their peripheral elements.

FIG. 3A schematically shows in vertical section view the light amount adjustment device 100 after assembly, in which two diaphragm blades 5 are shown among the six diaphragm blades 5 which are in a fully opened state. FIG. 3B shows in fragmentary enlarged section view the coil 6 and the back yoke 7 of the light amount adjustment device 100, together with their peripheral elements.

As shown in FIG. 3A, each of the diaphragm blades 5 has a dowel 52 in addition to the above-described dowel 51. The dowel 52 is formed on each diaphragm blade 5 on the side close to the cam plate 4 so as to correspond to the cam groove 41 of the cam plate 4. The dowel 51 of each diaphragm blade 5 is fitted to a corresponding one of the fitting holes 311 of the rotary plate 3, and the dowel 52 is fitted to a corresponding one of the cam grooves 41 of the cam plate 4.

The cover plate 2 is fixed to an outer peripheral wall of the cam plate 4. As previously described, the rotary plate 3, diaphragm blades 5, coil 6, and back yoke 7 are disposed between the cover plate 2 and the cam plate 4 as seen in the optical axis C direction (i.e., in the height direction of the light amount adjustment device 100). The soft magnetic portion 32 of the rotary plate 3 is disposed at the outer peripheral edge of the plate portion 31.

At a position diametrally outwardly of the soft magnetic portion 32 of the rotary plate 3, the coil 6 is disposed on a plane of the cam plate 4 extending perpendicular to the optical axis C such that the center position of the coil 6 in the optical axis direction substantially coincides with the position of the center of gravity of the soft magnetic portion 32. The back yoke 7 is disposed between the coil 6 and the cam plate 4. Reference numeral 8 denotes a control unit for controlling electric energization of the coil 6. The control unit 8 is, e.g., a microcomputer.

As shown in FIG. 3B, the back yoke 7 has an inner diameter 7a which is slightly smaller than an inner diameter 6a of the coil 6. Thus, an inner peripheral portion of the back yoke 7 is disposed to be spaced by a predetermined distance from the soft magnetic portion 32 of the rotary plate 3 and to face the soft magnetic portion 32, as viewed in the optical axis direction.

The rotary plate 3 has a gear portion in mesh with a pinion gear 11 (FIG. 3A) coupled to the output shaft of the motor 1, and is driven by the motor 1 to rotate about the optical axis C. With rotation of the rotary plate 3, each of the diaphragm blades 5 rotates about the dowel 51 in a plane perpendicular to the optical axis C, while the dowel 52 is guided along the cam groove 41 of the cam plate 4. Thus, the opening amount of the diaphragm blades 5 can be adjusted by rotating the rotary plate 3 by the motor 1.

Next, a description will be given of operation of the light amount adjustment device 100. When the coil 6 is electrically energized in a direction shown by circled X and dot symbols in FIG. 3A (forward energization) under the control of the control unit 8, a magnetic field is generated in the vicinity of the coil 6 as shown by arrow in FIG. 3B. In particular, as shown by dotted arrows in FIG. 3B, a strong magnetic field is generated between the soft magnetic portion 32 at the outer peripheral portion of the rotary plate 3 and the inner peripheral portion of the back yoke 7 facing the soft magnetic portion 32.

When the rotary plate 3 rotates in the magnetic field, a magnetic attracting force that displaces the soft magnetic portion 32 toward the back yoke 7 is applied to the soft magnetic portion 32 of the rotary plate 3, so that the outer peripheral portion of the rotary plate 3 is slightly displaced toward the inner peripheral portion of the back yoke 7. As a result, frictions between the diaphragm blades 5, between the diaphragm blades 5 and the cam plate 4, and between the diaphragm blades 5 and the rotary plate 3 increase. As a result, a load at the time of rotatively driving the diaphragm blades 5 in the light amount adjustment device 100 increases as compared to that at the time of non-energization of the coil 6.

The deceleration time or stabilization time at high speed driving of the light amount adjustment device 100 can be shortened by braking the drive of the light amount adjustment device 100 by utilizing the drive load that increases with forward energization of the coil 6, as will be described below with reference to FIG. 4.

Figure 4:
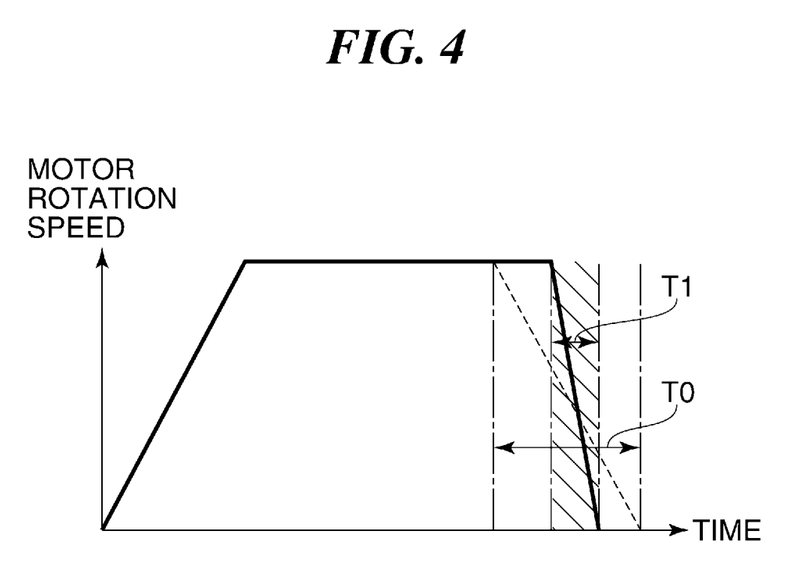
FIG. 4 is a graph showing a time-based change of motor rotation speed in the light amount adjustment device in comparison with that in a prior art apparatus.

FIG. 4 shows in graph a time-based change of motor rotation speed in the light amount adjustment device 100 in comparison with that in a prior art apparatus.

In FIG. 4, the motor rotation speed is taken along ordinate and the lapse of time is taken along abscissa. A solid polyline represents a time-based change of the rotation speed of the motor 1 in the light amount adjustment device 100 (i.e., represents a drive table for the motor 1), and a dotted polyline represents a time-based change of motor rotation speed in a prior art example (i.e., represents a prior art motor drive table).

The maximum rotation speed and rotation speed change at the time of acceleration operation of the motor 1 in the drive table for the motor 1 are the same as those in the prior art motor drive table, but start timing of deceleration operation of the motor 1 is delayed than that in the prior art motor drive table. It is therefore possible to lengthen a time period in which the motor 1 operates at the maximum rotation speed and to shorten a time period of deceleration operation of the motor 1, whereby driven members such as the rotary plate 3 and the diaphragm blades 5 can rapidly reach target rotation positions and hence the light amount adjustment can be speeded up.

However, in a case where the start timing of deceleration operation of the motor 1 is simply delayed to shorten the time period of deceleration operation of the motor 1, the motor 1 is rapidly decelerated and hence moments of inertia of the driven members cannot be absorbed. Accordingly, there is a fear that a loss of synchronization is caused, i.e., the motor 1 does not rotate in synchronism with control pulses.

In this embodiment, the forward energization of the coil 6 is started by the control unit 8 upon start of the deceleration operation of the motor 1. By conducting the forward energization for a time period shown by symbol T1 in FIG. 4, the drive load of the light amount adjustment device 100 is caused to increase, whereby a time period T0 of the prior art motor deceleration operation can be shortened to the deceleration operation time period T1, while preventing the loss of synchronization due to rapid deceleration of the motor 1.

It is effective to perform the deceleration operation of the motor 1 while conducting the forward energization of the coil 6 to increase the drive load of the light amount adjustment device 100, especially, in a light amount adjustment device which has a large aperture opening diameter and in which the moment of inertia of the rotary plate is large and the loss of synchronization is liable to occur. In addition, as compared to the prior art construction in which the diaphragm member is directly pressed by the plunger, a scratch or a dent is hardly generated on the diaphragm blades 5 and a smooth operation of the diaphragm blades 5 can be ensured, so that an accurate light amount adjustment can be made for a long time. Moreover, with the construction of this embodiment where a braking force is generated by the forward energization of the coil 6, a plunger and an installation space therefor are unnecessary.

According to this embodiment, the amount of light can be adjusted at high speed and with accuracy.

Second Embodiment

In a second embodiment of this invention, the electric energization of the coil 6 is controlled according to the orientation of the light amount adjustment device 100, thereby variably controlling the drive load of the light amount adjustment device 100 according to the orientation of the device 100. It is therefore possible to reduce a variation in drive load caused by a change in the orientation of the light amount adjustment device 100, whereby stop positions of the diaphragm blades 5 can be controlled with accuracy.

Figure 5A:
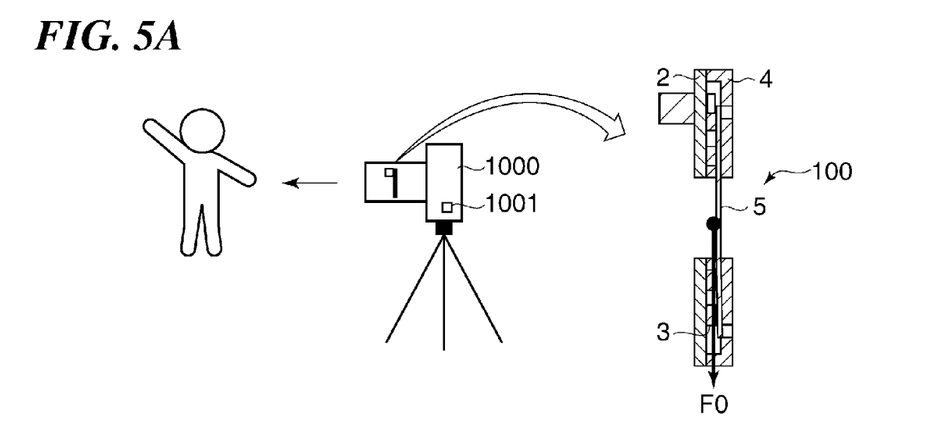
FIGS. 5A to 5C are views each showing a relation between the orientation of a light amount adjustment device and the direction of gravity for explanation of energization control according to a second embodiment of this invention.
Figure 5B:
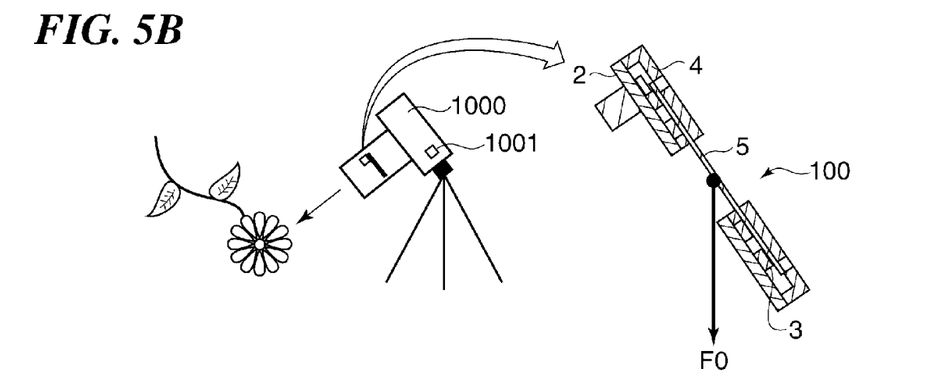
Figure 5C:
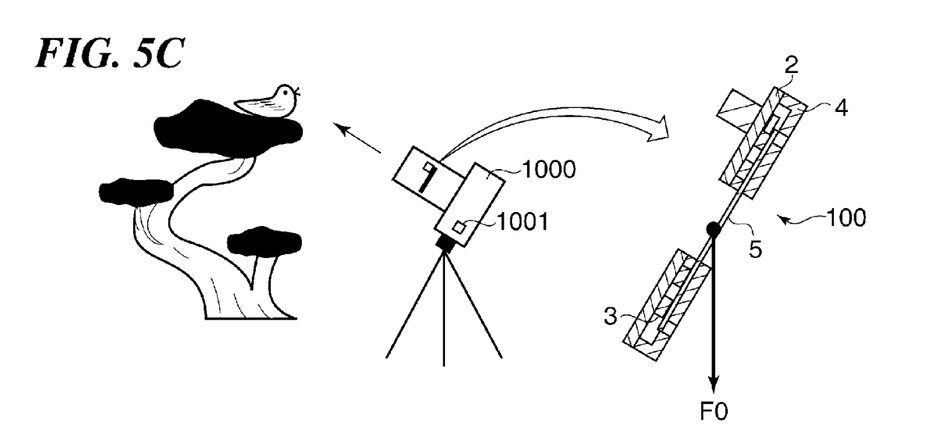

FIGS. 5A to 5C are views showing states where an image pickup apparatus that incorporates the light amount adjustment device 100 is in a normal orientation, in an obliquely downward orientation, and in an obliquely upward orientation. In FIGS. 5A to 5C, reference numeral 1000 denotes the image pickup apparatus incorporating the light amount adjustment device 100. Reference numeral 1001 denotes an orientation sensor, e.g., an acceleration sensor, which is incorporated in the image pickup apparatus 1000. Symbol F0 and arrow denote the direction of gravity applied to the light amount adjustment device 100.

As shown in FIGS. 5A to 5C, the orientation of the image pickup apparatus 1000 changes according to a positional relation between the image pickup apparatus and the object of photographing, and the direction F0 of a gravitational force applied to the light amount adjustment device 100 changes according to the orientation of the image pickup apparatus 1000. Thus, at the time of driving the diaphragm blades 5, the drive load of the light amount adjustment device 100 changes according to the direction of gravity F0.

In a case where the image pickup apparatus 1000 is in the normal orientation (FIG. 5A), the weight of the rotary plate 3 is not applied to the diaphragm blades 5, and therefore a friction is small that is produced between the diaphragm blades 5 and the rotary plate 3 when the light amount adjustment device 100 operates. On the other hand, in a case that the image pickup apparatus 1000 is in the downward orientation (FIG. 5B), the rotary plate 3 reclines on the cover plate 2, and therefore a friction becomes small that is produced between the diaphragm blades 5 and the rotary plate 3, so that the drive load of the light amount adjustment device 100 becomes small. In a case that the image pickup apparatus 1000 is in the upward orientation (FIG. 5C), the rotary plate 3 reclines on the cam plate 4 with the diaphragm blades 5 sandwiched therebetween, and therefore a friction becomes large that is produced between the diaphragm blades 5 and the rotary plate 3. Since the drive load of the light amount adjustment device 100 changes according to the orientation of the image pickup apparatus 1000 in this manner, there is a fear that the accuracy of light amount adjustment is lowered.

In this embodiment, based on the output from the acceleration sensor 1001 that changes according to the direction F0 of gravitational force applied to the light amount adjustment device 100, the control unit 8 controls the amount of current supplied to the coil 6 in such a manner that the drive load of the light amount adjustment device 100 becomes constant irrespective of the orientation of the image pickup apparatus 1000.

In a case where the image pickup apparatus 1000 is in the normal orientation (FIG. 5A), the control unit 8 controls to supply the coil 6 with a predetermined current during the operation of the light amount adjustment device 100, thereby applying a predetermined drive load to the adjustment device 100. In a case where the image pickup apparatus 1000 is in the downward orientation (FIG. 5B), the control unit 8 controls to supply the coil 6 with current larger than the predetermined current for the normal orientation, thereby increasing the magnetic attracting force that displaces the rotary plate 3 toward the cam plate 4. In a case where the image pickup apparatus 1000 is in the upward orientation (FIG. 5C), the control unit 8 controls to supply the coil 6 with current smaller than the predetermined current for the normal orientation, thereby decreasing the magnetic attracting force that displaces the rotary plate 3 toward the cam plate 4. It is therefore possible to reduce a variation in the drive load of the light amount adjustment device 100 caused by a change in the orientation of the image pickup apparatus 1000 and possible to accurately control stop positions of the diaphragm blades 5.

With the second embodiment, it is possible to achieve such an effect that an accurate high-speed light amount adjustment can be carried out with stability irrespective of the orientation of the image pickup apparatus 1000 as well as achieve the effects attained by the first embodiment.

The energization control is not limited to one performed according to the three orientations of the image pickup apparatus 1000, but can be performed according to four or more orientations. Alternatively, an amount of current supply to the coil 6 can steplessly be adjusted according to a change in the orientation of the image pickup apparatus 1000 by calculation or by referring to a table based on the output of the acceleration sensor 1001.

It should be noted that the acceleration sensor 1001 incorporated in the image pickup apparatus 1000 is an example of the orientation sensor, which can be any sensor capable of detecting the orientation of the light amount adjustment device 100. The orientation sensor can be provided in the light amount adjustment device 100. Alternatively, the control unit 8 can acquire an output of an external orientation sensor and can control the energization of the coil 6 according to the acquired sensor output.

In the second embodiment, the rotary plate 3 is configured to have the soft magnetic portion 32 provided at the outer peripheral edge of the plate portion 31. However, a plurality of soft magnetic portions can be provided in the plate portion 31. Alternatively, at least part of or the whole of the rotary plate 3 can be made of a soft magnetic material.

Third Embodiment

In a third embodiment of this invention, the energization of the coil 6 is controlled to cancel a change in torque of the motor 1, which is a stepping motor, whereby a change in torque of the stepping motor serving as the drive source can be reduced. In particular, the motor rotation speed at low-speed driving can be stabilized.

Figure 6:
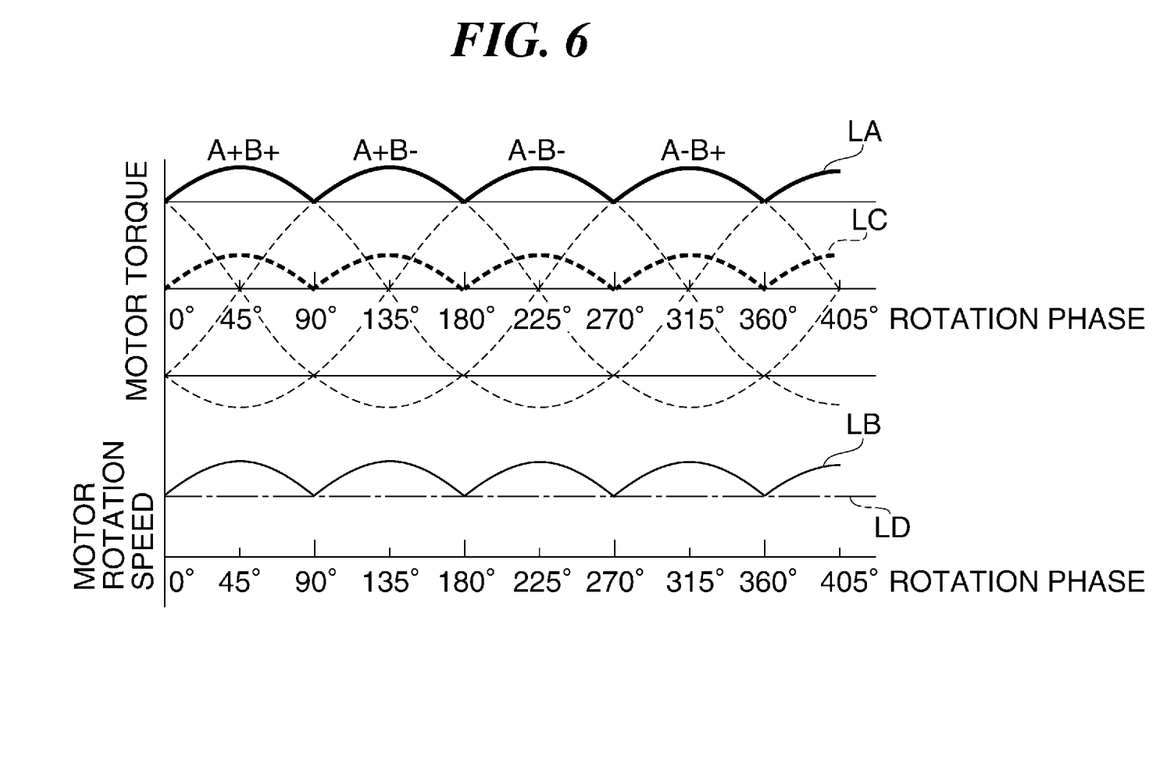
FIG. 6 is a view showing a relation among the rotation phase, torque, and rotation speed of a motor for explanation of energization control according to a third embodiment of this invention.

With reference to FIG. 6, a description will be given of motor drive control to cancel a change in driving torque of the stepping motor. FIG. 6 shows a relation among the rotation phase, torque, and rotation speed of the motor.

In FIG. 6, the rotation phase (electrical angle) of the motor driven by a two-phase excitation method is taken along abscissa, and the torque and rotation speed are taken along ordinate. Symbols "A+", "B+", "A−" and "B−" respectively denote forward energization of an A-phase coil, forward energization of a B-phase coil, reverse energization of the A-phase coil, and reverse energization of the B-phase coil. A symbol "A+B+" denotes an energization pattern to perform forward energization of the A-phase and B-phase coils, and also denotes motor torque generated by the forward energization of the A-phase and B-phase coils. As with the symbol "A+B+", each of symbols "A+B−", "A−B−" and "A−B+" denotes a corresponding energization pattern and corresponding motor torque although a description thereof is omitted.

In FIG. 6, a curved line LA denotes motor torque generated in a case where the energization pattern is changed in the order of "A+B+", "A+B−", "A−B−" and "A−B+" at each 90-degree rotation of a rotor of the motor. With this energization pattern changeover, the motor can output the maximum torque, but a variation of torque occurs. As a result, a variation occurs in the motor rotation speed as shown by a curved line LB. In particular, in a case where the motor is driven at low speed, there is a fear that the torque variation causes unevenness in the rotation speed of the rotary plate 3, so that the amount of light does not smoothly change, e.g., at the time of moving image photographing, whereby the quality of moving images is impaired.

Accordingly, in this embodiment, the control unit 8 controls the energization of the coil 6 according to the rotation phase of the motor 1 in such a manner that motor torque such as one shown by a curved line LC in FIG. 6 is generated. As a result, an apparent torque variation becomes zero, so that unevenness of the rotation speed of the motor 1 is eliminated as shown by a line LD in FIG. 6. This indicates that the motor rotation speed can be stabilized even when the motor 1 is driven at low speed.

In other words, the control unit 8 controls the energization in such a manner that a friction that cancels a variation in the rotation speed of the rotary plate 3 caused by a torque variation generated when the stepping motor is step-driven is generated between the rotary plate 3 and the cam plate 4. As a result, it is possible to stabilize rotation speeds of the rotary plate 3 and the diaphragm blades 5 as well as achieve the effects attained by the first embodiment.

In the first to third embodiments, the coil 6 is mounted to the cam plate 4 through the back yoke 7, but this is not limitative. For example, the coil 6 can be disposed at an arbitrary position on the cover plate 2 or on the cam plate 4 where the coil 6 can electromagnetically interact with the rotary plate 3. In that case, it is possible to apply a magnetic attracting force to the rotary plate 3 that rotates in the magnetic field generated by the coil 6, thereby causing the rotary plate 3 to apply a braking force to the diaphragm blades 5.

Fourth Embodiment

To attain a high shutter speed or a short exposure time in a compact digital camera, it is necessary to drive shutter blades at high speed in order to close a shutter aperture at high speed. However, the shutter blades, which are large in inertia, bounce at the time of high-speed driving, so that the shutter aperture once closed opens again in some cases. In other words, there is a limit in the drive speed of the shutter blades (shutter speed). Thus, the shutter blades are conventionally driven at a drive speed low enough to prevent the shutter blades from bouncing. A light amount adjustment device according to a fourth embodiment of this invention is configured to drive the shutter blades at high speed, while preventing the shutter blades from bouncing.

Figure 7:
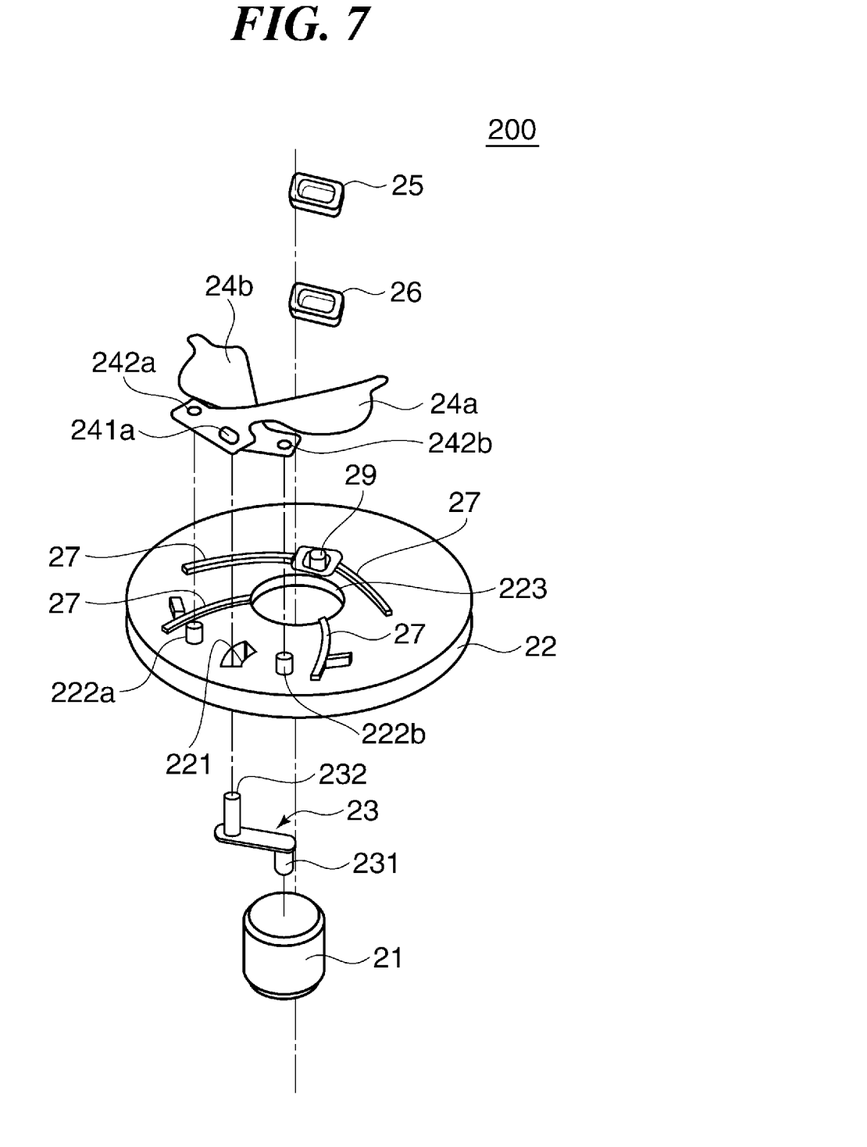
FIG. 7 is an exploded perspective view showing the construction of a light amount adjustment device according to a fourth embodiment of this invention.
Figure 8A:
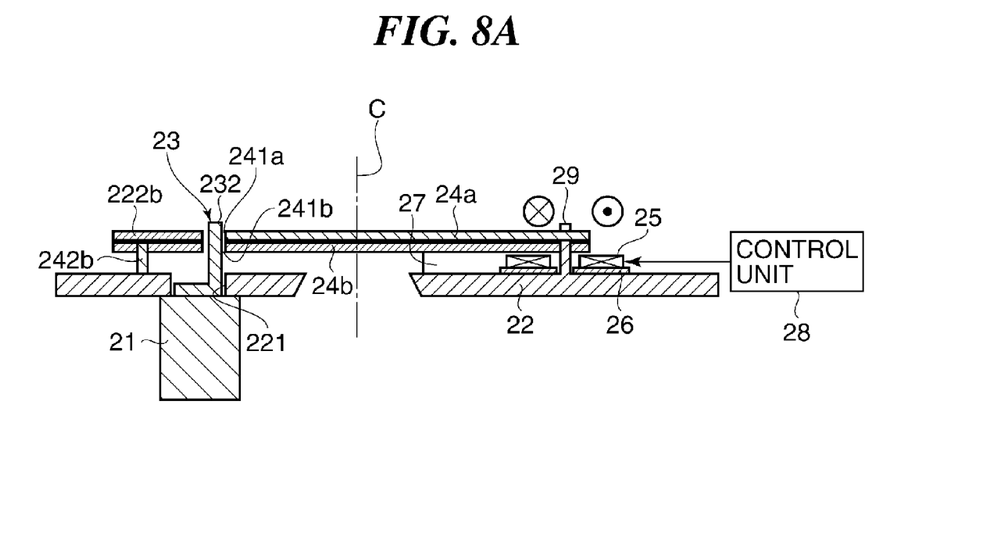
FIG. 8A is a vertical section view schematically showing the light amount adjustment device of FIG. 7.
Figure 8B:
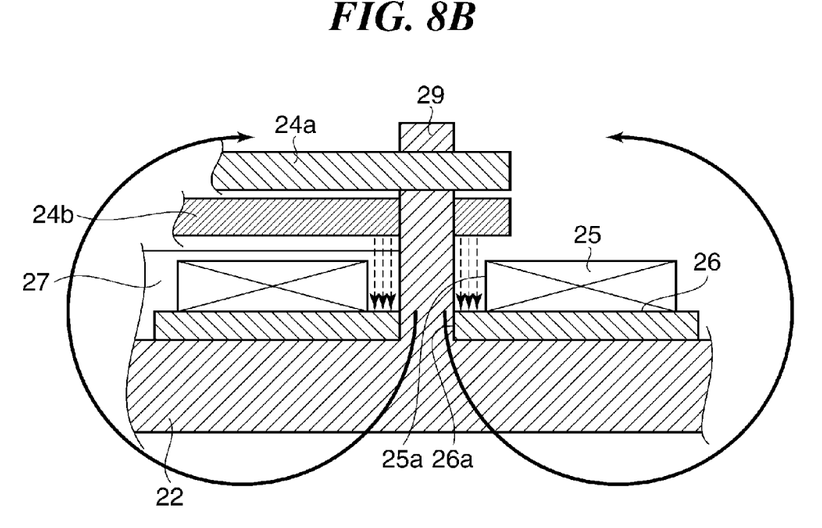
FIG. 8B is a fragmentary enlarged section view showing a coil and a back yoke of the light amount adjustment device, together with their peripheral elements.

FIG. 7 shows in exploded perspective view the construction of the light amount adjustment device according to the fourth embodiment, FIG. 8A schematically shows the light amount adjustment device in vertical section view, and FIG. 8B shows in fragmentary enlarged section view a coil and a back yoke of the light amount adjustment device, together with their peripheral elements.

The light amount adjustment device denoted by reference numeral 200 in FIG. 7 is a shutter device that is disposed in, e.g., a compact digital camera and used for adjustment of exposure time at photographing. The light amount adjustment device 200 includes a motor 21 serving as a drive source, a shutter base plate 22 as a base member, a shutter arm 23 as a driven member, shutter blades 24a, 24b (hereinafter sometimes denoted by reference numeral 24 collectively or without distinction therebetween) serving as light-shield members and made of a soft magnetic material, a coil 25, and a back yoke 26 as a back yoke member.

The motor 21 is fixed to the shutter base plate 22 that is formed with an arcuate opening 221 and a shutter aperture 223. On a surface of the shutter base plate 22 on the side close to the shutter blades 24a, 24b, there are formed guide shafts 222a, 222b, a projecting portion 29, and blade rails 27 disposed for sliding contact with the shutter blades 24.

The shutter arm 23 has a shaft portion 231 disposed coaxially with a rotary shaft of the motor 21 and an arm portion 232 rotatable about the shaft portion 231. The arm portion 23 extends through the arcuate opening 221 of the shutter base plate 22 in the optical axis direction and is fitted to elongated holes 241a, 241b formed in the shutter blades 24a, 24b. The shutter blades 24a, 24b are formed with holes 242a, 242b into which the guide shafts 222a, 222b of the shutter base plate 22 are inserted and fitted.

When the arm portion 232 of the shutter arm 23 driven by the motor 21 moves along the arcuate opening 221 of the shutter base plate 22, the shutter blades 24a, 24b rotate about the guide shafts 222a, 222b in a plane perpendicular to the optical axis C, while slidingly moved on the blade rails 27, thereby opening and closing the shutter aperture 223 of the shutter base plate 22.

The coil 25 is disposed on the shutter base plate 22 around the projecting portion 29 which is disposed away from the rotation centers of the shutter blades 24 (i.e., away from the guide shafts 222a, 222b), and the back yoke 26 is disposed between the coil 25 and the shutter base plate (see FIGS. 8A and 8B).

Next, with reference to FIGS. 8A and 8B, a further description will be given of the light amount adjustment device 200.

The coil 25 is disposed on a plane of the shutter base plate 22 extending perpendicular to the optical axis C so as to face the shutter blades 24 with a gap between the coil 25 and the shutter blades 24 as viewed in the optical axis direction. It should be noted that this embodiment is configured that in a case where the shutter blades 24 are in a fully-closed state (shown in FIG. 8A) or in a substantially fully-closed state, the coil 25 faces the shutter blades 24 over the entirety of a movable range of the shutter blades 24, but this is not limitative. In other words, in order to apply a braking force to the shutter blades 24 that are rotated in the magnetic field generated by the coil 25, it is enough for the coil 25 to face the shutter blades 24 in at least part of the movable range of the shutter blades 24.

As shown in FIG. 8B, the back yoke 26 has an inner diameter 26a that is slightly smaller than an inner diameter 25a of the coil 25. Thus, when the shutter blades 24 are in the fully-closed state or in the substantially fully-closed state, the back yoke 26 is disposed to face the shutter blades 24 and spaced from the shutter blades 24 by a predetermined distance as viewed in the optical axis direction in at least part of the movable range of the shutter blades 24.

Next, a description will be given of operation of the light amount adjustment device 200. When the coil 25 is electrically energized in a direction shown by circled X and dot symbols in FIG. 8A under the control of a control unit 28, a magnetic field is generated in the vicinity of the coil 25 as shown by arrow in FIG. 8B. In particular, as shown by dotted arrows in FIG. 8B, a strong magnetic field is generated between the shutter blades 24 and that portion of the back yoke 26 which is located inside the inner diameter 25a of the coil 25 and which faces the shutter blades 24.

When the shutter blades 24a, 24b rotate about the guide shafts 222a, 222b in the magnetic field, a magnetic attracting force that displaces the shutter blades toward the shutter base plate 22 is applied to the shutter blades 24a, 24b. As a result, contact pressures between the shutter blades 24 and between the shutter blades 24 and the blade rails 27 increase, so that sliding friction of the shutter blades 24 increases.

Bounce of the shutter blades that can occur at high speed driving of the light amount adjustment device 200 can be suppressed by braking the drive of the light amount adjustment device 200 by utilizing a sliding friction that increases with energization of the coil 25.

Figure 9:
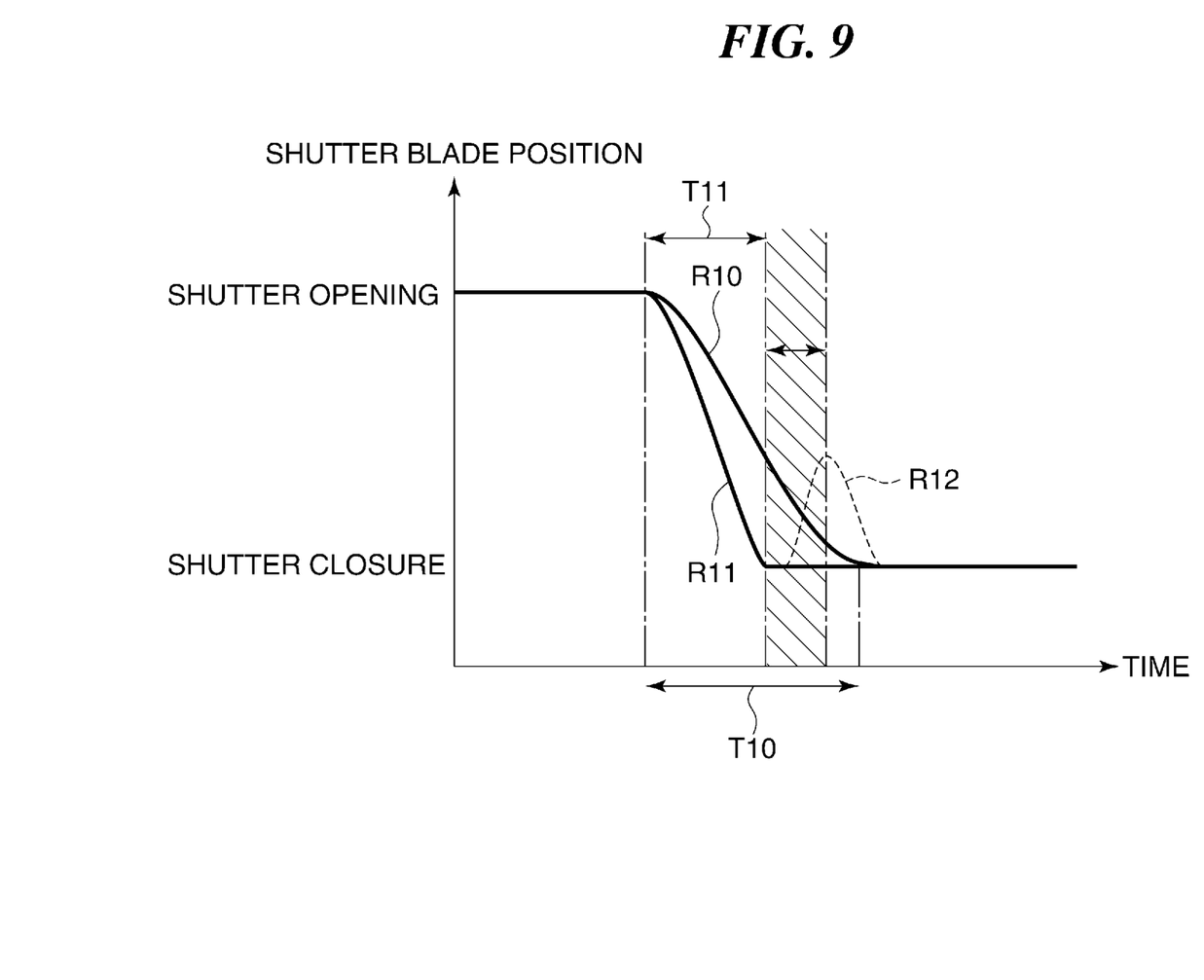
FIG. 9 is a graph showing exposure time at a closing operation of shutter blades in the light amount adjustment device in comparison with that in a prior art apparatus.

With reference to FIG. 9, exposure time at a closing operation of the shutter blades 24 in the light amount adjustment device 200 will be described. FIG. 9 shows exposure time at a closing operation of the shutter blades 24 in comparison with that in a prior art apparatus.

In FIG. 9, the lapse of time is taken along abscissa, and the moving position of each shutter blade 24 within the movable range from open to close of the shutter blade is taken along ordinate. A curved line R10 represents the moving position of a shutter blade that changes with the lapse of time at a closing operation of a prior art light amount adjustment device. A curved line R11 represents the moving position of the shutter blade 24 that changes with the lapse of time at a closing operation of the light amount adjustment device 200.

A curved line R12 represents a bounce (i.e., reopening of the once closed shutter blade) generated when the shutter blade is driven at high speed in the prior art light amount adjustment device.

At high-speed driving of the light amount adjustment device 200, under the control of the control unit 28, power is supplied to the coil 25 for a predetermined time period (corresponding to a time region shown by hatching in FIG. 9) from when the shutter blades 24 become a fully-closed state. Thus, as previously described, the magnetic field is generated in the vicinity of the coil 25, and a magnetic attracting force is applied to the shutter blades 24 rotating in the magnetic field, so that the shutter blades 24 are displaced toward the shutter base plate 22. As a result, the shutter blades 24 are brought in contact with the blade rails 27 on the shutter base plate 22 and a sliding friction of the shutter blades 24 increases, whereby an occurrence of bounce of the shutter blades 24 is avoided.

According to the fourth embodiment, the exposure time can be shortened from a conventional value shown at T10 in FIG. 9 to a value of T11 by driving the shatter blades 24 at high speed. In other words, it is possible to perform the light amount adjustment at high speed and with accuracy.

It should be noted that in the fourth embodiment, the whole of each shutter blade 24a or 24b is made of a soft magnetic material, but this is not limitative. For example, a part of or the whole of either one of the shutter blades 24a, 24b (e.g., a part that can be disposed to face the back yoke 26 or the coil 25) can be made of a soft magnetic material. The coil 25 is configured to have a part facing the shutter blades 24, but can be configured that the entire surface of the coil 25 faces the shutter blades 24. It is not inevitably necessary to provide the back yoke 7 or 26. Even if the back yoke is removed, a braking force can be applied to the shutter blades 5 or 24 rotatively driven in the magnetic field generated by the coil 6 or 25.

The energization control according to the orientation of the light amount adjustment device described in the second embodiment and/or the energization control that cancels a variation in stepping motor torque described in the third embodiment can be applied to the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-119161, filed May 27, 2011, which is hereby incorporated by reference herein in its entirety.

What is claimed is:

1. A light amount adjustment device comprising:
    a drive source;
    a base member formed with an aperture opening through which photographing light passes;
    a driven member configured to be driven by said drive source, at least part of said driven member being a soft magnetic portion;
    a light-shield member disposed between said base member and said driven member and configured to be driven by said driven member; and
    a coil disposed on said base member and configured to generate a magnetic field when said coil is electrically energized, wherein a magnetic attracting force is applied to the soft magnetic portion of said driven member that is driven by said drive source under the magnetic field, whereby the soft magnetic portion is displaced toward said base member.

2. The light amount adjustment device according to claim 1, further including:
    a soft magnetic back yoke member disposed between said coil and said base member,
    wherein at least part of said back yoke member is disposed to be spaced by a predetermined distance from the soft magnetic portion of said driven member and to face the soft magnetic portion as viewed in an optical axis direction.

3. The light amount adjustment device according to claim 1, further including:
    a control unit configured to control the energization of said coil,
    wherein said drive source is a stepping motor, and
    said control unit controls the energization of said coil in such a manner that a friction that cancels a variation in speed of said driven member caused by a torque variation generated when the stepping motor is step-driven is generated between said base member and said driven member.

4. The light amount adjustment device according to claim 1, further including:
    a control unit configured to control the energization of said coil according to an output from an orientation sensor that detects an orientation of the light amount adjustment device.

5. The light amount adjustment device according to claim 4, wherein the orientation sensor is an acceleration sensor.

6. A light amount adjustment device comprising:
a drive source;
a base member formed with an aperture opening through which photographing light passes;
a driven member configured to be driven by said drive source;
a light-shield member configured to be driven by said driven member, at least part of said light-shield member being a soft magnetic portion; and
a coil disposed on said base member and configured to generate a magnetic field when said coil is electrically energized, wherein a magnetic attracting force is applied to the soft magnetic portion of said light-shield member that is driven by said driven member under the magnetic field, whereby the soft magnetic portion is displaced toward said base member in at least part of a movable range of said light-shield member.

7. The light amount adjustment device according to claim 6, further including:
a soft magnetic back yoke member disposed between said coil and said base member,
wherein at least part of said back yoke member is disposed to be spaced by a predetermined distance from the soft magnetic portion of said light-shield member and to face the soft magnetic portion, as viewed in an optical axis direction, in at least part of the movable range of said light-shield member.

8. The light amount adjustment device according to claim 6, further including:
a control unit configured to control the energization of said coil,
wherein said drive source is a stepping motor, and
said control unit controls the energization of said coil in such a manner that a friction that cancels a variation in speed of said light-shield member caused by a torque variation generated when the stepping motor is step-driven is generated between said base member and said light-shield member.

9. The light amount adjustment device according to claim 6, further including:
a control unit configured to control the energization of said coil according to an output from an orientation sensor that detects an orientation of the light amount adjustment device.

10. The light amount adjustment device according to claim 9, wherein the orientation sensor is an acceleration sensor.

* * * * *